United States Patent
Donadille (10) Patent No.: US 9,923,366 B2
(45) Date of Patent: Mar. 20, 2018

(54) ELECTRICAL PROTECTION USING A SEMICONDUCTOR SWITCH

(71) Applicant: Airbus Operations (S.A.S.), Toulouse (FR)

(72) Inventor: Christian Donadille, Castanet Tolosan (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 936 days.

(21) Appl. No.: 14/289,236

(22) Filed: May 28, 2014

(65) Prior Publication Data

US 2014/0354039 A1 Dec. 4, 2014

(30) Foreign Application Priority Data

May 31, 2013 (FR) ..................... 13 54980

(51) Int. Cl.
| | |
|---|---|
| B60L 1/00 | (2006.01) |
| B60L 3/00 | (2006.01) |
| H02G 3/00 | (2006.01) |
| H02H 9/02 | (2006.01) |
| B64D 45/00 | (2006.01) |
| H02H 3/02 | (2006.01) |

(52) U.S. Cl.
CPC ............. *H02H 9/025* (2013.01); *B64D 45/00* (2013.01); *H02H 3/025* (2013.01)

(58) Field of Classification Search
CPC ........ H02H 9/025; H02H 3/025; B64D 45/00; H02J 7/0031
See application file for complete search history.

(56) References Cited

U.S. PATENT DOCUMENTS

| | | | | | |
|---|---|---|---|---|---|
| 4,404,473 | A | * | 9/1983 | Fox | H02H 9/025 307/125 |
| 5,467,242 | A | * | 11/1995 | Kiraly | H03K 17/0828 361/101 |
| 2003/0128493 | A1 | | 7/2003 | Nostrand | |
| 2005/0078024 | A1* | | 4/2005 | Harrington | H02J 1/08 341/155 |
| 2010/0172063 | A1* | | 7/2010 | Liu | H02H 1/04 361/118 |
| 2011/0279930 | A1* | | 11/2011 | Lin | H02M 1/32 361/18 |

(Continued)

FOREIGN PATENT DOCUMENTS

| | | |
|---|---|---|
| DE | 27 10 625 | 9/1978 |
| GB | 2 479 535 | 10/2011 |

OTHER PUBLICATIONS

French Search Report for Application No. FR 1354980 dated Jan. 31, 2014.

*Primary Examiner* — Rexford Barnie
*Assistant Examiner* — Rasem Mourad
(74) *Attorney, Agent, or Firm* — Jenkins, Wilson, Taylor & Hunt, P.A.

(57) ABSTRACT

The subject matter disclosed herein relates to methods and devices for protecting a circuit against overcurrents. The device uses variable impedance properties of a semiconductor switch and includes closed-loop control for controlling the impedance of the switch as a function of the overcurrents to be corrected. The physical design stresses of an electrical circuit, linked to the protection against overcurrents, can therefore be limited.

12 Claims, 3 Drawing Sheets

(56) References Cited

U.S. PATENT DOCUMENTS

| | | | | |
|---|---|---|---|---|
| 2012/0106013 | A1* | 5/2012 | Yang | G01R 19/16542 361/87 |
| 2012/0215213 | A1* | 8/2012 | Juzkiw | A61B 18/14 606/33 |
| 2013/0214805 | A1* | 8/2013 | Saloio, Jr. | H02H 3/044 324/750.01 |
| 2014/0240884 | A1* | 8/2014 | Chang | H02H 9/025 361/93.1 |

* cited by examiner

FIG.1

Legend
102 – Source
103 – Load
104 – Current measurement
105 – Switch
106 – Comparator
107 – Closed loop control
108 – Time measurement
109 – Time comparator

FIG.8

ELECTRICAL PROTECTION USING A SEMICONDUCTOR SWITCH

CROSS-REFERENCE TO RELATED APPLICATION

This application claims priority to French Patent Application No. 13 54980 filed on May 31, 2013, the entire content of which is incorporated by reference herein.

DESCRIPTION

Technical Field

The present subject matter relates to the field of the methods implemented in an aircraft, to protect an electrical circuit of the aircraft against overcurrents. The subject matter disclosed herein relates also to a device for protecting an electrical circuit against overcurrents, said electrical circuit comprising a load powered by an electrical power source of an aircraft.

Background

An overcurrent is an electrical current greater than the nominal current associated with a load. For information, the nominal current of a load is the current circulating in that load in ideal conditions of operation. Overcurrents can be generated by a power source of that load, notably in the event of a short circuit.

Throughout the text, the term "load" will designate an electrical load.

Devices are known from the prior art for protecting a circuit against overcurrents, implemented in aircraft. These devices comprise electromechanical switches that can assume a closed state and an open state. When an overcurrent is detected, the switch is opened. A few milliseconds elapse between the start of the overcurrent and the instant when the circuit is opened by the opening of the electromechanical switch. During these few milliseconds, the electrical circuit is subjected to very high currents. The electrical circuit must therefore be rated to be able to withstand these high currents for a few milliseconds. These high currents can range up to the value of the short-circuit current of the power source, in transient mode (for a few milliseconds).

In particular, the electrical links between a power source of the aircraft and a load must withstand these high currents for several milliseconds. For this, these electrical links are produced using power cables rated such that they withstand such electrical currents. The power cables therefore have a very large cross-sectional area, which makes them particularly heavy and bulky.

The heavy and bulky nature of said power cables runs counter to the constraints to be observed on board an aircraft, in which the aim, on the contrary, is to minimize these two parameters.

New generations of power sources in the aircraft exhibit particularly high power levels. It is then possible for overcurrents of several hundred amperes, or even several thousand amperes, to occur, for a few milliseconds. This will, for example, be the case in the event of a short circuit. These overcurrents must therefore be withstood by the power cables. These specific power cables then have a cross-sectional area, and therefore a weight and a bulk, that are becoming greater.

One objective of the present subject matter is to propose a method for managing overcurrents, implemented in an aircraft, and that makes it possible to reduce the weight and the bulk of an electrical circuit in which this method is implemented.

Another objective of the present subject matter is to propose an electrical circuit comprising a device for managing overcurrents, intended to be installed in an aircraft, the device for managing overcurrents making it possible to reduce the weight and the bulk of the electrical circuit.

SUMMARY

This objective is achieved with a method implemented in an aircraft, for protecting a circuit against overcurrents, said circuit comprising a load, a power source electrically powering the load and comprising at least one electrical generator of the aircraft, and an electrical link linking the load and the power source, the method comprising a step of measuring a current circulating on the electrical link.

According to the subject matter disclosed herein, the method comprises:
  comparison of the measured current with a reference current;
  when the measurement current is greater than the reference current, triggering of a closed-loop control of the impedance of a semiconductor switch mounted in series on the electrical link, so as to regulate the measured current to the value of the reference current, the closed-loop control being provided as long as the measured current does not fall back below the reference current;
  measurement of a time, called regulation time, during which the closed-loop control is implemented;
  opening of the switch when the regulation time is greater than a predetermined time.

Whereas in the prior art, the idea was to rate all of the electrical circuit in such a way that it could withstand the overcurrents, the idea on which the subject matter disclosed herein is based is to limit these overcurrents.

The proposed solution consists in replacing an electromechanical switch used conventionally as circuit breaker in an aircraft, with a semiconductor switch. A semiconductor switch offers two notable advantages:
  it offers a very short response time, typically of the order of a few microseconds; and
  it offers a so-called linear mode or state, in which it exhibits a variable impedance property. It is thus possible to regulate the current by a closed-loop control, as soon as this current exceeds a predetermined current threshold called reference current.

By virtue of the regulation of the current, the current is prevented from taking excessively high values, greater than the reference current.

It is also possible to substantially limit a time during which the electrical circuit has to withstand high currents, since the response time of the semiconductor switches is very short.

By virtue of the method according to the subject matter disclosed herein, it is possible to relax the constraints on the electrical circuit, comprising a power source, a load, and an electrical link between the two. In particular, it is possible to reduce the cross-sectional area of the power cables linking the power source and the load. The weight and the bulk of all of the electrical installation in the aircraft are thus reduced.

The overcurrents are generated by a power source of the electrical circuit. Since the current is regulated in such a way that it does not exceed a reference current, the rest of the electrical circuit does not need to be matched to the capacity of the power source. Whatever the power source, the condition for the electrical circuit to be protected is that this circuit withstands an overcurrent corresponding to the difference between the reference current and the nominal current. An additional advantage of the subject matter disclosed herein is therefore to propose a method for protecting against overcurrents, that makes it possible for the constraints, corresponding to the facility for the rest of the electrical circuit to withstand high currents, to be independent of the power source used. The constraints of compatibilities between different elements of one and the same electrical circuit are thus reduced.

The method also proposes opening the switch if the closed-loop control lasts too long, in order to avoid destroying the switch by subjecting it to an overcurrent for too long.

The method according to the subject matter disclosed herein can be implemented in a power distribution box which distributes, to the loads of the aircraft, an electrical power supplied at least by an electrical generator of the aircraft.

Advantageously, the method is implemented to reduce the weight and the bulk of the electrical power cables in the aircraft.

The closed-loop control may comprise the following steps:
  calculation of a difference between the measured current and the reference current;
  generation of a regulation signal, and adjustment of its amplitude as a function of the difference between the measured current and the reference current;
  modification of the impedance of the switch as a function of the amplitude of the regulation signal.

The switch can exhibit, at its terminals, an impedance which depends linearly on the amplitude of the regulation signal.

Advantageously, the current measurement comprises a generation of a measurement signal representative of the measured current, and a low-pass filtering is performed on the measurement signal.

Preferably, the current measurement comprises a generation of a measurement signal representative of the measured current, and the measurement signal is amplified.

The predetermined time can be between ten milliseconds and one second.

The reference current is preferably between one and two times a so-called nominal current, corresponding to the current circulating on the electrical link in the absence of overcurrent.

The subject matter disclosed herein relates also to an electrical circuit of an aircraft comprising:
  a load,
  a power source electrically powering the load and comprising at least one electrical generator of the aircraft, and
  an electrical link linking the load and the power source.

According to the subject matter disclosed herein, the electrical circuit also comprises a device for protecting the circuit against overcurrents, the device comprising:
  means for measuring the current travelling along the electrical link;
  a semiconductor switch mounted in series on the electrical link;
  a comparator for comparing the measured current with a reference current;
  closed-loop control means for controlling the impedance of the switch (105), suitable for regulating the measured current to the value of the reference current;
  time measurement means, for measuring a time during which the measured current is regulated to the value of the reference current;
  a time comparator, for comparing the measured time with a predetermined time and controlling the opening of the switch when the measured time is greater than the predetermined time.

The closed-loop control means can be connected to the comparator and suitable for generating a regulation signal and for adjusting its amplitude as a function of the difference between the measured current and the reference current, the closed-loop control means being connected to the switch in such a way that the regulation signal controls the impedance at the terminals of the switch.

The switch is advantageously an insulated-gate field-effect transistor (MOSFET), an insulated-gate bipolar transistor (IGBT), or a junction field-effect transistor (JFET).

The subject matter disclosed herein relates finally to an aircraft comprising:
  at least one electrical generator,
  loads to be powered electrically, and
  a power distribution box linked at the input to the at least one electrical generator, linked at the output to said loads, and arranged to distribute, to said loads, an electrical power supplied by the at least one electrical generator.

According to the subject matter disclosed herein, the power distribution box comprises at least one protection device according to the subject matter disclosed herein.

BRIEF DESCRIPTION OF THE DRAWINGS

The present subject matter will be better understood on reading the description of exemplary embodiments given purely as an indication and in a non-limiting manner, with reference to the appended drawings in which.

DETAILED DESCRIPTION

A protection device 100, according to an embodiment of the subject matter disclosed herein, will be described first, with reference to FIG. 1. The illustration of the device according to the subject matter disclosed herein will also make it possible to illustrate the method according to the subject matter disclosed herein.

The protection device 100 is placed on the electrical link 101, in series between a power source consisting of a voltage source, 102, and a load, 103, for example an electrical equipment item.

The assembly comprising the electrical link 101, the voltage source 102, the load 103, and the protection device 100, forms an electrical circuit 110 according to the subject matter disclosed herein.

The device 100 protects the electrical circuit against overcurrents travelling along the link towards the load 103. In particular, the device 100 protects the load 103 and the electrical link 101.

The power source 102 may comprise a battery of an aircraft, and/or an electrical generator of the aircraft. "Electrical generator of the aircraft" will be used to describe an electrical generator comprising at least one element from:
- one or more generators in the nacelle receiving the engines, these generators being driven by the engines,
- the generator in the rear cone of the fuselage of the aircraft, driven by the auxiliary power unit (APU),
- the backup generator in the wings of the aircraft, or RAT standing for "Ram Air Turbine".

The load 103 is an electrical equipment item of the aircraft, that has to be powered by a current of at least 1 A, or even at least 3 A, for example 3 A or 5 A. It is important to note that the field of the subject matter disclosed herein is that of the high currents typically greater than 1 A, unlike the field of low currents used in electronics.

Current measurement means 104 are mounted in series or in parallel on the electrical link 101. They may consist of:
- a Hall-effect current sensor, delivering a voltage proportional to a magnetic field generated by a current;
- a shunt sensor, delivering a voltage which depends on a current passing through a low-value resistor;
- a thermal ammeter using a resisting wire which heats up by Joule effect when current passes along it;
- any other appropriate means for measuring an electrical current.

The current measurement means 104 are arranged to measure the current circulating on the electrical link 101. They generate a measurement signal $V_{mes}$ representative of the measured current $I_{mes}$.

A comparator 106 receives as input this measurement signal $V_{mes}$ and a reference signal $V_{ref}$. The reference signal $V_{ref}$ is representative of a current threshold value called reference current $I_{ref}$. This threshold value is greater than the nominal current associated with the load 103.

The comparator 106 is arranged to calculate a difference between the measurement signal $V_{mes}$ and the reference signal $V_{ref}$. $V_{mes}$ is representative of the measured current $I_{mes}$. $V_{ref}$ is representative of the reference current $I_{ref}$. A difference between the measured current $I_{mes}$ and the reference current $I_{ref}$ is therefore calculated indirectly.

The comparator 106 makes it possible to detect when a threshold is exceeded, in other words, when the measured current $I_{mes}$ is greater than the reference current $I_{ref}$.

The output of the comparator 106 is linked to closed-loop control means 107. A closed-loop control is implemented as soon as the measured current $I_{mes}$ is greater than the reference current $I_{ref}$.

The closed-loop control means 107 control the impedance of a semiconductor switch 105. This semiconductor switch 105 is mounted in series on the electrical link 101, between the current measurement means 104 and the load 103.

The impedance of the switch 105 opposes the passage of the current over the link 101.

The closed-loop control means make it possible to regulate the measured current $I_{mes}$ to the value of the reference current $I_{ref}$.

In particular, the closed-loop control means 107 are arranged to generate a regulation signal $V_{reg}$ which controls the impedance of the switch 105. The impedance of the switch 105 depends on the amplitude of the regulation signal $V_{reg}$. The closed-loop control means 107 therefore adjust the amplitude of the regulation signal $V_{reg}$ as a function of the difference, at each instant, between the measured current $I_{mes}$ and the reference current $I_{ref}$. If the measured current begins to increase, the impedance of the switch 105 is increased. If the measured current begins to decrease, the impedance of the switch 105 is reduced.

The closed-loop control means therefore co-operate at each instant with the comparator 106.

Provision can also be made for the comparator 106 to be connected to the closed-loop control means 107 only to activate the current regulation, the closed-loop control means 107 then comprising specific subtractor means, arranged to calculate the difference between the measured current $I_{mes}$ and the reference current $I_{ref}$. In this case, it can be considered that the closed-loop control means comprise:
- a subtractor for calculating a difference between the measured current $I_{mes}$ and the reference current $I_{ref}$;
- regulation means for generating a regulation signal $V_{reg}$ and adjusting its amplitude as a function of the difference between the measured current $I_{mes}$ and the reference current $I_{ref}$, the regulation means being connected to the switch in such a way that the regulation signal $V_{reg}$ controls the impedance of the switch.

The closed-loop control is provided as long as the measured current $I_{mes}$ does not fall back down below or equal to the reference current $I_{ref}$. Any oscillations due to the response time of the closed-loop control are not taken into consideration.

For example, in the event of a short circuit, an overcurrent occurs which tends then to decrease until the current is back at its nominal value. Thus, the closed-loop control means first of all impose a high impedance on the switch 105, then make it decrease gradually until it is zero. When the impedance of the switch 105 is zero, without the measured current $I_{mes}$ being greater than the reference current $I_{ref}$, the closed-loop control is no longer implemented. In practice, it may be that the impedance of the switch is not exactly zero. It is therefore considered that the impedance of the switch 105 is zero, when it is at its minimum value.

According to an exemplary embodiment of the closed-loop control, the impedance $Z(t)$ of the switch is controlled as follows:

$Z(t_0)=A*(I_{mes}(t_0)-I_{ref})$, as soon as $I_{mes}(t_0)>I_{ref}$,
then $Z(t+\delta t)=Z(t)+B*(I_{mes}(t+\delta t)-I_{ref})$,
in which A and B are positive real numbers, and $t_0$ is the instant to be counted from which $I_{mes}>I_{ref}$;
as soon as $Z(t+\delta t)=0$, the regulation is stopped and $Z(t)=0$, $\forall I_{mes}(t)$, as long as $I_{mes}(t)<I_{ref}$.

The device 100 also comprises time measurement means 108. These time measurement means 108 measure a regulation time, during which the closed-loop control is implemented. The output of the time measurement means 108 is linked to a time comparator 109. The time comparator 109 also receives as input a predetermined time $T_{ref}$. When the regulation time reaches the predetermined time $T_{ref}$, the time comparator orders the opening of the switch 105. It can be considered that the time measurement means 108 and the time comparator 109 together form a "timer".

It can therefore be seen that, if the need for regulation persists beyond a predetermined time, the load 103 is powered down by the opening of the switch 105.

The reference time $T_{ref}$ is defined in such a way as to avoid unwanted openings of the switch 105. There is also a check to ensure that this reference time $T_{ref}$ remains appropriate to the heat dissipation capabilities of the switch 105. In practice, the switch 105 may be damaged if it is passed through by a current greater than or equal to the current $I_{ref}$ beyond a maximum time, called "damage limit time". This damage limit time can be increased using a switch 105 comprising a plurality of transistors mounted in parallel. The reference time $T_{ref}$ is generally of the order of around ten to around one hundred milliseconds.

If, before the regulation time reaches the reference time $T_{ref}$, it is no longer necessary to regulate the current, the time comparator 109 is reset to zero. A new regulation time will be measured again, counting from the next time when a closed-loop control is implemented.

In other words, according to the abovementioned example of closed-loop control, the impedance Z of the switch is then controlled as follows:

$Z(t_0)=A*(I_{mes}(t_0)-I_{ref})$, as soon as $I_{mes}(t_0)>I_{ref}$,
then as long as $t<T_{ref}$, $Z(t+\delta t)=Z(t)+B*(I_{mes}(t+\delta t)-I_{ref})$,
in which A and B are positive real numbers, and $t_0$ is the instant to be counted from which $I_{mes}>I_{ref}$;
as long as $t<T_{ref}$, as soon as $Z(t+\delta t)=0$, the regulation is stopped: $Z(t)=0$, $\forall I_{mes}(t)$, as long as $I_{mes}(t)<I_{ref}$
otherwise, as soon as $t \geq T_{ref}$, $Z(t)=\infty$, $\forall t$.

To sum up, the switch 105 can take three states:
an open state in which it blocks the passage of the current;
a closed state in which it allows the current to pass; and
a so-called linear state, in which it exhibits a variable impedance at its terminals.

The switch 105 has three terminals: a first terminal for receiving a control signal, a second terminal linked to the current measurement means 104 and a third terminal linked to the load 103, the impedance of the switch being that considered between its second and third terminals. The control signal is generated by the closed-loop control means 107.

The control signal is formed by the regulation signal $V_{reg}$, and drives:
initially, the transition of the switch 105 from the closed state to the linear state;
then, the trend of the impedance value of the switch 105.

At least one of the elements out of the comparator 106, the closed-loop control means 107, the time measurement means 108 and the time comparison means 109 will be able to be produced in the form of a microcontroller.

The semiconductor switch is formed by one or more semiconductor electronic components, such as a transistor. It is for example at least one transistor, notably an insulated-gate field-effect transistor (MOSFET), an insulated-gate bipolar transistor (IGBT), or a junction field-effect transistor (JFET). The expression "electronic switch" can also be used to designate a semiconductor switch.

Means (not represented) may be provided for shaping the measurement signal $V_{mes}$.

These means may comprise:
a low-pass filter, intended to smooth the measurement signal in order to eliminate spurious noises and avoid an unwanted triggering of the regulation; and
an amplifier, intended to bring the measurement signal $V_{mes}$ to an amplitude that makes it possible to more easily perform the various desired functions.

Figure 1:
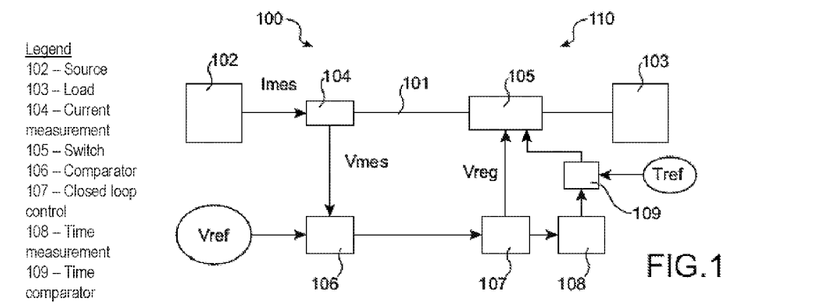
FIG. 1 schematically illustrates an electrical circuit according to one embodiment of the subject matter disclosed herein, comprising a protection device according to the subject matter disclosed herein and making it possible to implement a method according to the subject matter disclosed herein.
Figure 2:
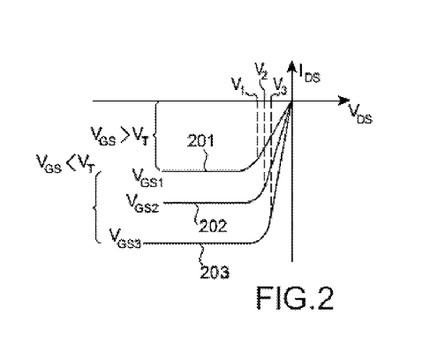
FIG. 2 illustrates characteristic curves of a semiconductor switch that can be used in the circuit illustrated in FIG. 1.

FIG. 2 illustrates characteristic curves of a transistor that can be used as switch 105 in the embodiment of the subject matter disclosed herein represented in FIG. 1. These characteristic curves typically correspond to a powering up of the transistor.

The transistor is a p-channel insulated-gate field-effect transistor MOSFET. The transistor has three terminals: a gate denoted G, a drain denoted D, and a source denoted S, as is known per se. The MOSFET transistor is said to be enriched, which means that its doping is such that the junction GS between the gate and the source must be biased below a threshold voltage $V_T$ (negative) to obtain the existence of a channel in the transistor.

FIG. 2 gives a series of curves 201, 202, 203, representing the value of the current $I_{DS}$ (current circulating between the drain and the source) as a function of the voltage $V_{DS}$ (voltage between the drain and the source). Each curve 201, 202 or 203 corresponds to a respective value of the voltage $V_{GS}$ between the gate and the source.

For $V_{GS}>V_T$, the current $I_{DS}$ is zero, the transistor is blocked and the switch 105 is open. For a given curve 201 (respectively 202, 203), if $V_1<V_{DS}<0$ (respectively $V_2<V_{DS}<0$, $V_3<V_{DS}<0$), the dependency between the current $I_{DS}$ and the voltage $V_{DS}$ is substantially linear. The curve 201 exhibits a slope K such that $I_{DS}=K*V_{DS}$, in which $K=1/z$. The transistor then behaves like an impedance Z. The slope K varies according to the value of $V_{GS}$. It is therefore possible to obtain a variable impedance behaviour for the transistor, by acting on the value of the voltage $V_{GS}$. If $V_{DS}<V_1$ (respectively $V_{DS}<V_2$, $V_{DS}<V_3$), the transistor is in saturated mode. The voltage $V_{DS}$ is constant, and the impedance Z between the drain and the source is zero: the switch 105 is closed. By controlling the value of the voltage $V_{GS}$ by means of the regulation signal $V_{reg}$, it is possible to control the current operating mode of the transistor as well as the impedance between the drain and the source.

Knowing the characteristics of a transistor, a person skilled in the art will easily be able to design the closed-loop control means 107 for them to supply a regulation signal $V_{reg}$ suited to the desired behaviour of the transistor.

Figure 3:
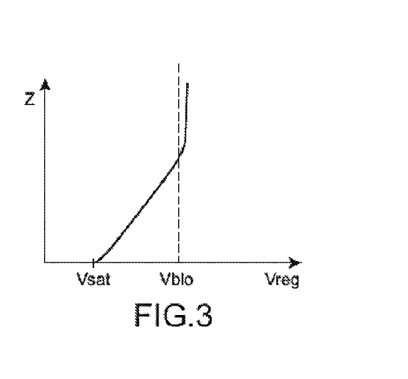
FIG. 3 schematically illustrates the impedance at the terminals of the semiconductor switch as a function of a control signal.

FIG. 3 schematically illustrates the impedance of the semiconductor switch 105 as a function of a control signal $V_{reg}$.

For an amplitude of the control signal of between 0 and $V_{sat}$, the switch 105 is closed: the impedance at its terminals is zero. In practice, it may take a non-zero, but negligible, value.

For an amplitude of the control signal greater than $V_{blo}$, the switch 105 is open.

For an amplitude of the control signal of between $V_{sat}$ and $V_{blo}$, the switch 105 exhibits an impedance which depends on the control signal $V_{reg}$.

In linear mode, most transistors exhibit a linear dependency between the regulation signal and the impedance between their terminals. The control of the impedance is then simplified.

Figure 4A:
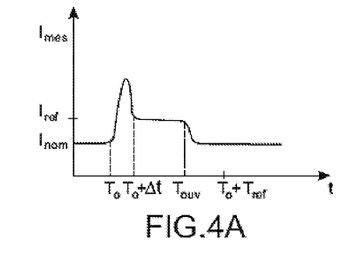
FIG. 4A illustrates a first example of current circulating in a circuit in which the method illustrated in FIG. 1 is implemented.

FIG. 4A illustrates a first example of measured current $I_{mes}$ circulating on the link 101, as a function of time t. At an instant $T_0$, the measured current $I_{mes}$ becomes greater than the reference current $I_{ref}$. The closed-loop control of the current to the value of the reference current is implemented. Thus, after a time $\Delta t$ corresponding to a response time of the device 100 according to the subject matter disclosed herein, the measured current $I_{mes}$ is equal to the reference current $I_{ref}$.

Before a reference time $T_{ref}$, to be counted from $T_0$, has elapsed, the measured current $I_{mes}$ has fallen back below the reference current $I_{ref}$. In particular, the measured current $I_{mes}$ has fallen back below the reference current $I_{ref}$ at an instant $T_{ouv}$. From the instant $T_{ouv}$, the switch 105 is closed.

Figure 4B:
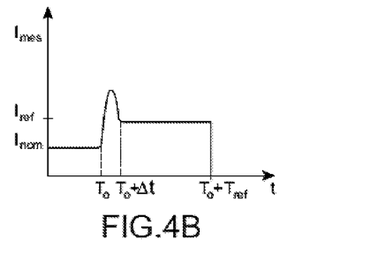
FIG. 4B illustrates a second example of current circulating in a circuit in which the method illustrated in FIG. 1 is implemented.

FIG. 4B illustrates a second example of measured current $I_{mes}$ circulating on the link 101, as a function of time t. At an instant $T_0$, the measured current $I_{mes}$ becomes greater than the reference current $I_{ref}$.

After a reference time $T_{ref}$, to be counted from $T_0$, has elapsed, the measured current $I_{mes}$ has still not fallen back below the reference current $I_{ref}$. This leads to the opening of the switch 105. The measured current $I_{mes}$ is therefore zero counting from the instant $T_0+T_{ref}$.

Figures 5, 6A:
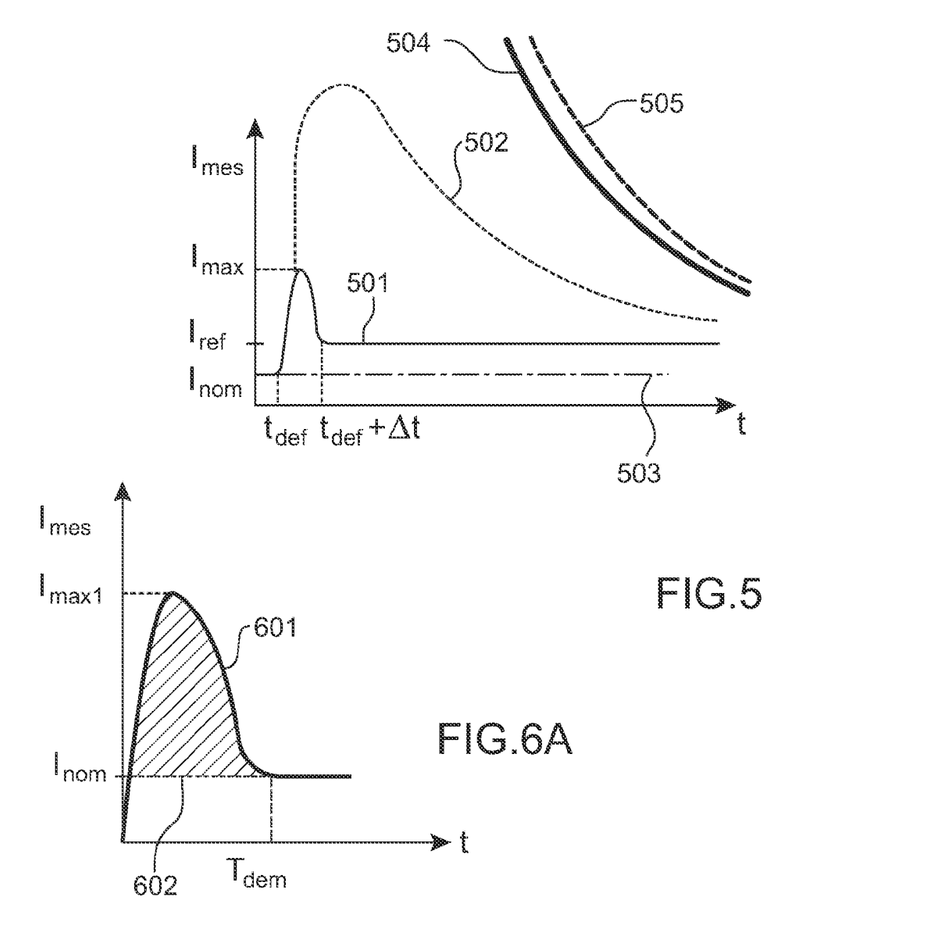
FIG. 5 illustrates the current with and without implementation of the method according to the subject matter disclosed herein, and curves of current withstand strength of an electrical power cable.
FIG. 6A illustrates an example of current circulating, when a load is started up, in a circuit in which the method according to the subject matter disclosed herein is not implemented.

FIG. 5 illustrates, by the continuous thin line curve 501, the measured current $I_{mes}$ circulating on the link 101, as a function of time t. This is the measured current $I_{mes}$ circulating on the link 101 when the method according to the subject matter disclosed herein is implemented. The reference current $I_{ref}$ is between 1.5 and 2 times the nominal current $I_{nom}$. It will be recalled that the nominal current $I_{nom}$ is the current designed to circulate on the link 101 in ideal operating conditions. The nominal current $I_{nom}$ is generally greater than 1 A. It is, for example, greater than or equal to 3 A, and is for example 3 A or 5 A.

At an instant $t_{def}$, an overcurrent occurs. The measured current $I_{mes}$ exceeds the value of the reference current $I_{ref}$. By virtue of the method and the device according to the subject matter disclosed herein, a regulation signal makes it possible to regulate the measured current $I_{mes}$ to bring it to the value of the reference current $I_{ref}$. Thus, after a time $\Delta t$ corresponding to a response time of the device 100 according to the subject matter disclosed herein, the measured current $I_{mes}$ is equal to the reference current $I_{ref}$. The response time $\Delta t$ is very short, of the order of a few microseconds, for example less than ten microseconds. This particularly short response time is obtained through the use of an electronic switch (semiconductor switch). Such response times would be impossible to obtain with conventional technologies based on electromechanical breaking elements.

During the overcurrent, the measured current reaches a maximum value $I_{max}$ of the order of three to six times the value of the nominal current $I_{nom}$.

As a comparison, there is also represented, in FIG. 5 and by the dotted line curve 502, the current circulating on the link 101 in the prior art, as a function of time t. In this case, an electrical power cable as described in the introduction is used, having a large cross-sectional area and therefore a high weight and bulk. The current can reach more than thirty times the value of the nominal current $I_{nom}$, i.e. currents of several hundred amperes, and take several hundreds of milliseconds to return to the value of the nominal current. For reasons of legibility of the figure, the scale is not observed between the curve 501 and the other curves of FIG. 3.

The chain-dotted line 503 corresponds to the nominal current $I_{nom}$.

It will be assumed that the load is purely resistive.

The area contained between the dotted line curve 502 and the chain-dotted line curve 503, between two instants t, corresponds to the energy that the electrical power cable according to the prior art must be able to withstand.

The continuous thick line curve 504 illustrates the capacity of the electrical power cable to withstand high currents. The thick dotted line curve 505 illustrates the mechanical withstand strength limit of the electrical power cable. If the curve 502 of the current as a function of time passes below the curve 505, the electrical power cable is damaged.

The area contained between the continuous thin line curve 501 and the chain-dotted line curve 503, between two instants t, corresponds to the energy that an electrical power cable must be able to withstand, when a protection method according to the subject matter disclosed herein is implemented. It can therefore be seen that it is possible to greatly reduce the capacities of the electrical power cable to withstand high currents, and therefore its weight and its bulk.

An electrical circuit has for example been studied, in which the electrical links are provided by an electrical power cable suitable for a nominal current $I_{nom}$ of three amperes (3 A). The expression "3 A protection" applies. It has been able to be demonstrated that the method according to the subject matter disclosed herein makes it possible to retain this same 3 A protection, when the nominal current is 5 A.

For this, the following were compared:
a first curve illustrating the capacities of the electrical power cable to withstand overcurrents associated in the prior art with a nominal current of 3 A;
a second curve illustrating the value of the measured current for a nominal current $I_{nom}$=3 A, and a reference current $I_{ref}$=4 A, when the method according to the subject matter disclosed herein is implemented; and
a third curve illustrating the value of the measured current for a nominal current $I_{nom}$=5 A, and a reference current $I_{ref}$=7 A, when the method according to the subject matter disclosed herein is implemented.

It has been possible to demonstrate in particular that the third curve always remained below the first curve. Thus, a given protection makes it possible to be suited to greater nominal current values, by virtue of the method and the device according to the subject matter disclosed herein. This is tantamount to stating that, for a given nominal current, it is possible to reduce the constraints concerning the high current withstand strength of an electrical circuit, when this electrical circuit comprises a device according to the subject matter disclosed herein.

Advantageously, the method (respectively the device) according to the subject matter disclosed herein is implemented in a centralized manner, for example at the output of the power source. It is thus possible to limit all of the current withstand strength constraints for the different elements of the electrical circuit, notably the electrical links and the electrical equipment items powered by said source.

An additional advantage of the method and the device according to the subject matter disclosed herein is illustrated with reference to FIGS. 6A and 6B.

FIG. 6A illustrates an example of current circulating, on starting up an electrical equipment item, when the method according to the subject matter disclosed herein is not implemented. An overcurrent can be observed that corresponds to a load current. The load current can reach a maximum value $I_{max1}$ ranging up to twenty times the value of the nominal current $I_{nom}$. The current will take a time $T_{dem}$ of several milliseconds before stabilizing at the nominal current value.

The electrical circuit, in particular the load to be electrically powered and the electrical link linking said load to an electrical power source, will therefore have to be able to withstand an energy, shown shaded in FIG. 6A, and corresponding to the area between the curve 601 of the measured current as a function of time and the curve 602 constant at the nominal current value.

Figure 6B:
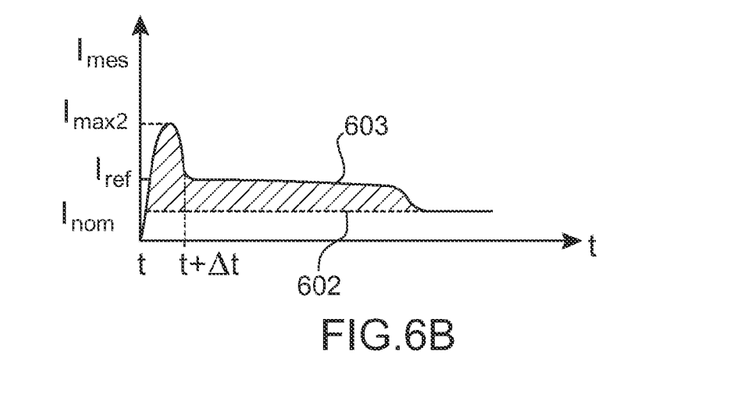
FIG. 6B illustrates an example of current circulating, when a load is started up, in a circuit in which the method illustrated in FIG. 1 is implemented.

FIG. 6B illustrates an example of current circulating, when an electrical equipment item starts up, when a method according to the subject matter disclosed herein is implemented. For reasons of legibility of the figures, the scale is not the same between FIGS. 6A and 6B. The curve 603 illustrates the value of the measured current $I_{mes}$ as a function of time. As illustrated in FIG. 5:

the measured current does not exceed a current $I_{max2}$ of the order of three to six times the nominal current, and
the measured current is rapidly brought to the value of the reference current, after a time Δt of the order of a few microseconds.

The electrical circuit, in particular the load to be electrically powered and the electrical link linking said load to an electrical power source, will therefore have to be able to withstand an energy, shown shaded in FIG. 6B, and corresponding to the area between the curve 603 of the measured current as a function of time and the curve 602 constant at the nominal current value.

The current inrush when a load is started up leads to the appearance of a voltage transient at the terminals of the other loads linked to the same power source. In the prior art, this disturbance is, for example, avoided by restarting the loads already operating when a new load is started up. It is also possible to add capacitors making it possible to limit the impact of the voltage transient.

The subject matter disclosed herein makes it possible to limit the load current, and thus reduce the voltage transient. The starting of a load disturbing the other loads already in operation is thus avoided. It is thus possible to dispense with heavy and bulky capacitors intended, in the prior art, to limit the impact of the voltage transient on the loads already in operation.

The subject matter disclosed herein is implemented in an aircraft, where the weight and bulk constraints are considerable.

Figure 7:
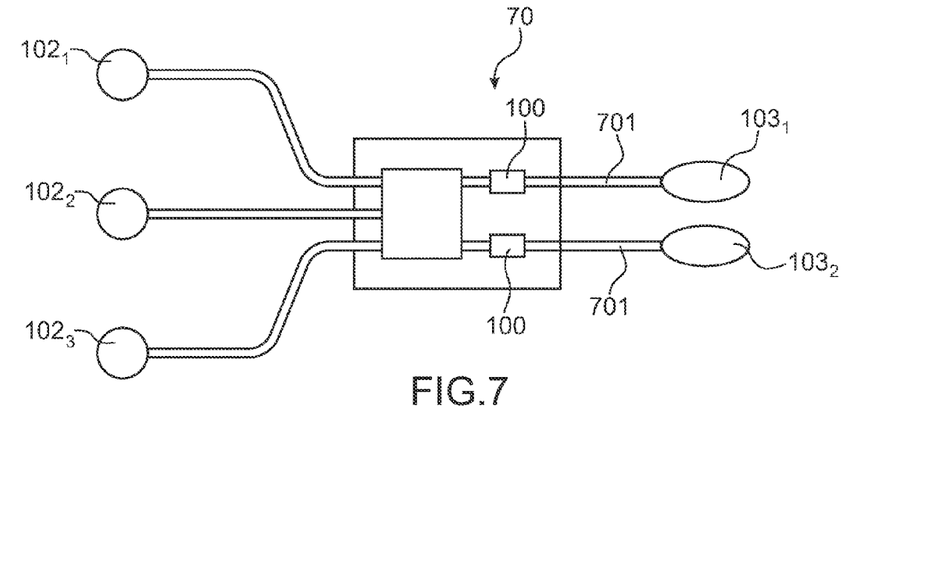
FIG. 7 illustrates a power distribution box for an aircraft, comprising devices according to the subject matter disclosed herein.

A power distribution box 70 comprising a plurality of protection devices 100 according to the subject matter disclosed herein will first of all be described, with reference to FIG. 7.

These power distribution boxes for aircraft, also called "electrical master boxes", are known from the prior art. Such a power distribution box receives as input an electrical energy supplied by at least one voltage source of the aircraft. Here, three voltage sources $102_1$, $102_2$, $102_3$ are represented.

Each voltage source $102_1$, respectively $102_2$ or $102_3$, may comprise an electrical generator of the aircraft, typically situated:
at the rear of the aircraft, in a rear cone of the fuselage,
in the engine nacelle, or
in the wings for the case of the backup generators.

The power distribution box distributes the electrical power to the different electrical loads $103_1$, $103_2$ inside the aircraft. Two loads $103_1$, $103_2$ are represented here, but it goes without saying that as many as necessary thereof can be provided.

The power distribution box 70 is generally situated at the front of the aircraft, in the avionics bay. It is linked by electrical power cables 701 to the different electrical loads. These electrical loads consist of various electrical or electronic equipment items.

The power distribution box 70 according to the subject matter disclosed herein comprises a plurality of circuit protection devices 100. Advantageously, as many devices 100 according to the subject matter disclosed herein are provided as there are different values of the current necessary to power the different loads. A device 100 according to the subject matter disclosed herein can be provided for each load to be electrically powered via the power distribution box 70.

Each assembly comprising a protection device 100, a load $103_1$ or $103_2$, an electrical power cable 701, and at least one of the power sources $102_1$, $102_2$, $102_3$, forms an electrical circuit according to the subject matter disclosed herein.

Figure 8:
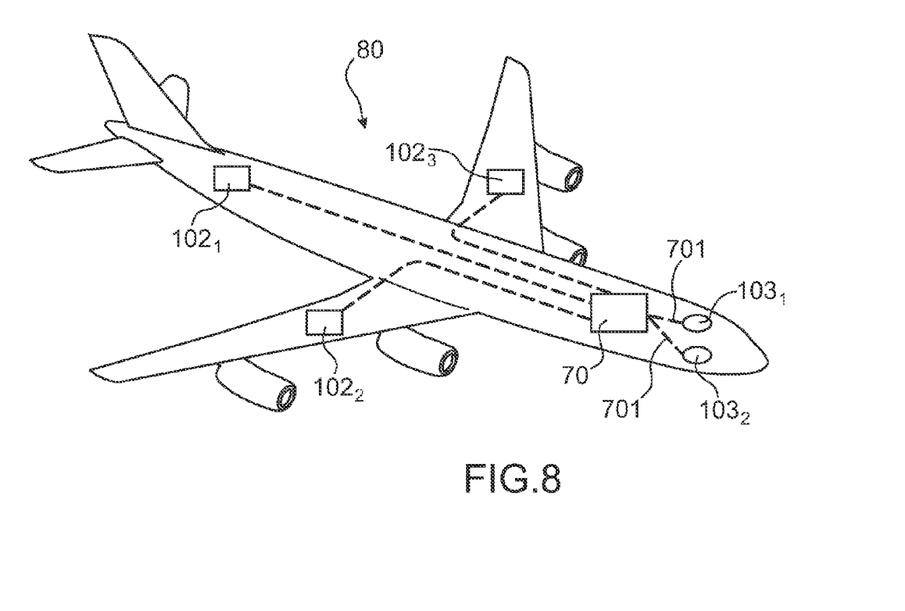
FIG. 8 illustrates an aircraft comprising a power distribution box as represented in FIG. 7.

Finally, FIG. 8 schematically shows an aircraft 80 comprising:
the power sources $102_1$, respectively $102_2$ or $102_3$,
the loads $103_1$, $103_2$,
the electrical power cables 701, and
the power distribution box 70 as described with reference to FIG. 7.

Advantageously, the aircraft has a metallic structure, said structure providing the current return path from the loads to the electrical generators.

Implementing the method according to the subject matter disclosed herein makes it possible to limit the maximum current circulating in all the electrical network of an aircraft. It is thus possible to limit the constraints on numerous elements of the aircraft, namely:
the metallic structure of the aircraft;
the electrical or electronic equipment items to be powered, by reducing their installation and internal kitting-out constraints (in other words, if the current arriving at an equipment item is effectively limited, the needs for additional protections at the equipment item input are reduced);
the power distribution box which no longer has to withstand the short-circuit currents of the electrical generators;
the power cables;
the bundles of electrical cables, called harnesses.

In particular, the total weight of the aircraft can be reduced by some tens or even hundreds of kilograms.

The invention claimed is:

1. A method implemented in an aircraft, for protecting an electrical circuit of this aircraft against overcurrents, said circuit comprising a load, a power source electrically powering the load and comprising at least one electrical generator of the aircraft, and an electrical link linking the load and the power source, the method comprising measuring a current circulating on the electrical link, and comprising:
comparing the measured current ($I_{mes}$) with a reference current ($I_{ref}$);
when the measurement current ($I_{mes}$) is greater than the reference current ($I_{ref}$), triggering of a closed-loop control of the impedance of a semiconductor switch mounted in series on the electrical link, so as to regulate the measured current ($I_{mes}$) to the value of the reference current ($T_{ref}$), the closed-loop control being applied as long as the measured current ($I_{mes}$) does not fall back below the reference current ($I_{ref}$), wherein triggering the closed-loop control of the impedance of the semiconductor switch comprises controlling the semiconductor switch to change from a closed state to a linear state and to remain in the linear state during the closed-loop control, and wherein the semiconductor switch exhibits, in the linear state, an impedance which depends on an amplitude of a regulation signal applied to the semiconductor switch;

measuring a time, called regulation time, during which the closed-loop control is implemented; and opening the semiconductor switch, by controlling the semiconductor switch to change from the linear state to an open state, when the regulation time is greater than a predetermined time ($T_{ref}$).

2. The method according to claim 1, implemented in a power distribution box which distributes, to the loads of the aircraft, an electrical power supplied at least by an electrical generator of the aircraft.

3. The method according to claim 1, wherein the closed-loop control comprises:
calculation of a difference between the measured current ($I_{mes}$) and the reference current ($I_{ref}$);
generation of a regulation signal ($V_{reg}$), and adjustment of its amplitude as a function of the difference between the measured current ($I_{mes}$) and the reference current ($I_{ref}$); and
modification of the impedance of the switch as a function of the amplitude of the regulation signal ($V_{reg}$).

4. The method according to claim 3, wherein the switch exhibits, at its terminals, an impedance which depends linearly on the amplitude of the regulation signal ($V_{reg}$).

5. The method according to claim 1, wherein the current measurement comprises a generation of a measurement signal ($V_{mes}$) representative of the measured current ($I_{mes}$), and in that a low-pass filtering is performed on the measurement signal ($V_{mes}$).

6. The method according to claim 1, wherein the current measurement comprises a generation of a measurement signal ($V_{mes}$) representative of the measured current ($I_{mes}$), and in that the measurement signal ($V_{mes}$) is amplified.

7. The method according to claim 1, wherein the predetermined time ($T_{ref}$) is between ten milliseconds and one second.

8. The method according to claim 1, wherein the reference current ($I_{ref}$) is between one and two times a so-called nominal current ($I_{nom}$), corresponding to the current circulating on the electrical link in the absence of overcurrent.

9. An aircraft electrical circuit, comprising:
a load;
a power source electrically powering the load and comprising at least one electrical generator of the aircraft; and
an electrical link linking the load and the power source; and further comprising a device for protecting the circuit against overcurrents, the device comprising:
a measurement circuit for measuring the current travelling along the electrical link;
a semiconductor switch mounted in series on the electrical link;
a comparator for comparing the measured current ($I_{mes}$) with a reference current ($I_{ref}$);
a closed-loop control for controlling the impedance of the semiconductor switch, suitable for regulating the measured current ($I_{mes}$) to the value of the reference current ($I_{ref}$), wherein controlling the impedance of the semiconductor switch comprises controlling the semiconductor switch to change from a closed state to a linear state and to remain in the linear state during the closed-loop control, and wherein the semiconductor switch exhibits, in the linear state, an impedance which depends on an amplitude of a regulation signal applied to the semiconductor switch;
a time measurement circuit, for measuring a time during which the measured current ($I_{mes}$) is regulated to the value of the reference current ($I_{ref}$); and
a time comparator, for comparing the measured time with a predetermined time ($T_{ref}$) and controlling the opening of the semiconductor switch, by controlling the semiconductor switch to change from the linear state to an open state, when the measured time is greater than the predetermined time.

10. An aircraft electrical circuit according to claim 9, wherein the closed-loop control is connected to the comparator and suitable for generating a regulation signal ($V_{reg}$) and for adjusting its amplitude as a function of the difference between the measured current ($I_{mes}$) and the reference current ($I_{ref}$), the closed-loop control being connected to the switch in such a way that the regulation signal ($V_{reg}$) controls the impedance at the terminals of the switch.

11. An aircraft electrical circuit according to claim 9, wherein the switch is an insulated-gate field-effect transistor (MOSFET), an insulated-gate bipolar transistor (IGBT), or a junction field-effect transistor (JFET).

12. An aircraft, comprising:
at least one electrical generator;
loads to be electrically powered; and
a power distribution box linked at the input to at least one electrical generator, linked at the output to said loads, and arranged to distribute, to said loads, an electrical power supplied by at least one electrical generator; and
wherein the power distribution box comprises at least one protection device according to claim 9.

* * * * *